United States Patent [19]

Michalko

[11] 4,216,122

[45] Aug. 5, 1980

[54] MANUFACTURE OF HIGH SURFACE AREA SPHEROIDAL ALUMINA PARTICLES HAVING A HIGH AVERAGE BULK DENSITY

[75] Inventor: Edward Michalko, Hemet, Calif.

[73] Assignee: UOP Inc., Des Plaines, Ill.

[21] Appl. No.: 960,140

[22] Filed: Nov. 13, 1978

[51] Int. Cl.$^2$ ........................ B01J 21/04; B01J 37/00
[52] U.S. Cl. .................................. 252/448; 252/463; 423/628
[58] Field of Search ............... 252/448, 463; 423/628, 423/631

[56] References Cited

U.S. PATENT DOCUMENTS

| | | | |
|---|---|---|---|
| 2,774,743 | 12/1956 | Hoekstra | 252/448 |
| 3,887,492 | 6/1975 | Hayes | 252/448 |

*Primary Examiner*—P. E. Konopka
*Attorney, Agent, or Firm*—James R. Hoatson, Jr.; Robert W. Welch; William H. Page, II

[57] ABSTRACT

A method of preparing high surface area-high average bulk density spheroidal alumina particles is disclosed. Spheroidal alumina hydrogel particles prepared by the oil drop method are aged in an aqueous ammoniacal solution containing from about 4 to about 20 wt. % ammonium salt, and thereafter water-washed, dried and calcined to yield high surface area spheroidal alumina particles having an average bulk density of from about 0.6 to about 0.8 grams per cubic centimeter.

10 Claims, No Drawings

MANUFACTURE OF HIGH SURFACE AREA SPHEROIDAL ALUMINA PARTICLES HAVING A HIGH AVERAGE BULK DENSITY

This invention relates to the manufacture of high surface area-high average bulk density spheroidal alumina particles of macro dimension. Spheroidal alumina particles offer numerous advantages when employed as a catalyst, or as a catalyst support or carrier material. In a fixed bed type of operation, said particles permit a more uniform packing whereby variations in pressure drop across the bed are minimized, and the tendency of a reactant stream to channel through the bed out of effective contact with the catalyst is substantially obviated. In a moving bed type of operation, the fluid character of spheroidal particles offers a further and important advantage.

Spheroidal alumina particles of macro dimension (1/32-⅛" dia.) are advantageously manufactured by the well known oil-drop method substantially as described by Hoekstra in U.S. Pat. No. 2,620,314. Briefly, the method comprises commingling an acidic alumina hydrosol with a gelling agent characterized as a weak base which hydrolyzes to ammonia with increasing temperature, and dispersing the mixture as droplets in a hot oil bath, frequently referred to as forming oil, and generally contained in a vertical column or forming tower. The forming oil is typically a light gas oil chosen principally for its high interfacial tension with respect to water. Thus, as each droplet penetrates the oil surface, it draws into a spherical shape. The droplets are principally water at this stage and, being insoluble in the oil, they tend to assume a shape having the least surface area for its volume. A second effect is that the formed hydrosol droplets gravitating to the bottom of the forming oil are progressively gelled to a stage sufficient to maintain the structural integrity of the resulting hydrogel spheres. The spheroidal particles are aged in the forming oil and then in an aqueous ammoniacal solution before a final water-wash, drying and calcining operation.

The described oil-drop method includes a number of process variables which affect the physical characteristics of the spheroidal alumina product. Generally, the aluminum/acid anion ratio of the acidic alumina hydrosol will influence the average bulk density of the spheroidal alumina produce and, correspondingly, the pore volume and pore diameter characteristics attendant therewith, lowerratios tending toward higher average bulk densities. Low average bulk density alumina spheres, i.e., less than about 0.5 grams per cubic centimeter, are generally formed at aluminum/acid anion ratios of from about 1.0 to about 1.5. Other process variables affecting the physical characteristics of the alumina product include the time, temperature and pH at which the spheroidal hydrogel particles are aged. Surface area is normally a function of calcination temperature. High surface area spheroidal alumina particles of relatively high average bulk density in excess of about 0.6 grams per cubic centimeter, have in many cases worked an improvement in activity stability as well as activity when utilized as a support or carrier material for other catalytic components.

It is an object of this invention to present a novel method of preparing high surface area-high average bulk density spheroidal alumina particles.

In one of its broad aspects, the present invention embodies a method which comprises commingling an ammonia precursor and an acidic alumina hydrosol at below gelation temperature, said ammonia precursor being decomposable to ammonia with increasing temperature; dispersing the mixture of droplets in a hot oil bath maintained at a temperature effecting the decomposition of said ammonia precursor and the formation of spheroidal hydrogel particles therein; separating and aging the spheroidal particles for a period of from about 5 to about 25 hours at a temperature of from about 75° C. to about 105° C. in an aqueous ammoniacal solution containing from about 0.5 to about 3 wt.% ammonia and an ammonium salt concentration in the range of from about 4 to about 20 wt.%, and adjusting the average bulk density of the spheroidal alumina product in the range of from about 0.6 to about 0.8 grams per cubic centimeter by varying the ammonium salt concentration of said aqueous ammoniacal solution in the stated range; and water-washing, drying, and calcining the aged spheroidal alumina particles.

One of the more specific embodiments relates to a method which comprises commingling hexamethylenetetramine and an aluminum hydroxychloride hydrosol at below gelation temperature; dispersing the mixture of droplets in an oil bath maintained at a temperature of from about 50° C. to about 105° C. and effecting decomposition of said hexamethylenetetramine and the formation of spheroidal hydrogel particles therein; separating and aging said particles for a period of from about 10 to about 25 hours at a temperature of from about 90° C. to about 105° C. in an aqueous ammoniacal solution containing from about 0.5 to about 3 wt.% ammonia and an ammonium chloride concentration in the range of from about 4 to about 20 wt.%, and adjusting the average bulk density of the spheroidal alumina product in the range of from about 0.6 to about 0.8 grams per cubic centimeter by varying the ammonium chloride concentration of said aqueous ammoniacal solution in the stated range; and water-washing, drying, and calcining the aged spheroidal alumina particles at a temperature of from about 425° C. to about 750° C.

A still more specific embodiment relates to a method which comprises commingling hexamethylenetetramine and an aluminum hydroxychloride hydrosol at below gelation temperature; dispersing the mixture of droplets in an oil bath maintained at a temperature of from about 50° C. to about 105° C. and effecting decomposition of said hexamethylenetetramine and the formation of spheroidal hydrogel particles therein; retaining the hydrogel spheres in said oil bath until said spheres achieve a pH of from about 5.5 to about 7.5; separating and treating the spheroidal hydrogel particles for a period of at least 15 minutes in an ammonium chloride-buffered aqueous ammoniacal solution containing from about 0.1 to about 0.5 wt.% ammonia and from about 0.5 to about 5 wt.% ammonium chloride; aging said particles for a period of from about 10 to about 25 hours at a temperature of from about 90° C. to about 105° C. in an aqueous ammoniacal solution containing from about 0.5 to about 3 wt.% ammonia and an ammonium chloride concentration in the range of from about 4 to about 20 wt.%, and adjusting the average bulk density of the spheroidal alumina product in the range of from about 0.6 to about 0.8 grams per cubic centimeter by varying the ammonium chloride concentration of said aqueous ammoniacal solution in the stated range; and water-washing, drying, and calcining the aged spheroidal alumina particles at a temperature of from about 425° C. to about 750° C.

Other objects and embodiments of this invention will become apparent in the following detailed specification.

The acidic alumina hydrosols herein contemplated include such as are prepared by the hydrolysis of a suitable acid salt of aluminum, for example aluminum chloride, and reduction of the acid anion concentration of the solution, for example, the chloride anion concentration thereof. Reduction of the acid anion concentration can be accomplished by subjecting an aluminum salt solution to electrolysis utilizing an electrolytic cell with a porous partition between the anode and the cathode. In this manner, an acid anion deficiency is created in the cathode compartment whereby an olation reaction is promoted with the formation of inorganic polymers of colloidal dimension dispersed and suspended in the remaining liquid. In some cases, as in the case of aluminum acetate, the acid anion is sufficiently volatile that the reduction in acid anion concentration can be effected simply by heating. A particularly suitable method is in the use of aluminum metal as a neutralizing agent in conjunction with, for example, an aqueous aluminum chloride solution. In this instance, the salt of neutralization is itself a hydrolyzable aluminum salt subject to polymerization and ultimate sol formation.

An aluminum chloride hydrosol, variously referred to as an aluminum oxychloride hydrosol, aluminum hydroxychloride hydrosol, and the like, is a preferred acidic alumina hydrosol for use in the method of this invention. A particularly desirable aluminum chloride hydrosol is prepared by digesting aluminum metal in hydrochloric acid at about reflux temperature—usually a temperature of from about 80° C. to about 105° C., and reducing the chloride anion concentration of the resulting aluminum chloride solution by the device of maintaining an excess of aluminum reactant in contact with the reaction mixture as a neutralizing agent until a hydrosol containing aluminum and chloride anion in a ratio of from about 0.9:1 to about 1.5:1 is formed. The hydrosol is preferably prepared to contain less than about 14 wt.% aluminum, generally from about 12 to about 14 wt.%.

In accordance with the oil-drop method, the acidic alumina hydrosol is commingled with an ammonia precursor at below gelation temperature, suitably at a temperature of from about 10° C. to about 25° C., the ammonia precursor being decomposable or hydrolyzable to ammonia with increasing temperature. Thus, as the mixture is dispersed as droplets in a hot oil bath, ammonia is evolved and acts as a neutralizing or a setting agent, and an ammonium salt of neutralization is formed in the aqueous phase of the resulting spheroidal hydrogel particles. The ammonia precursor is most often hexamethylenetetramine, or urea, or mixtures thereof, although other weakly basic materials which are substantially stable at normal temperatures but decomposable or hydrolyzable to ammonia with increasing temperature may be employed. The acidic alumina hydrosol is commingled with a sufficient amount of hexamethylenetetramine, or other ammonia precursor, to effect at least complete neutralization of the acid anion contained in said hydrosol upon total decomposition or hydrolysis to ammonia. For example, an aluminum chloride hydrosol is typically commingled with sufficient quantity of a 28–40 wt.% aqueous hexamethylenetetramine solution to provide a mixture containing hexamethylenetetramine and chloride anion in a mole ratio of about 1:2.

Only a fraction of the ammonia precursor is hydrolyzed or decomposed to ammonia in the relatively brief period in which initial gelation occurs with the formation of firm spheroidal particles. In a subsequent aging process, the residual ammonia precursor contained in the spheroidal particles continues to hydrolyze and effect further gelation of the particles and establish the pore structure of the spheroidal alumina product. The spheroidal particles are typically initially aged in the hot forming oil for at least about 10 hours and thereafter further aged in an aqueous ammoniacal solution. In accordance with one preferred embodiment of this invention, the spheroidal particles are retained and aged in the hot forming oil until they achieve a pH of from about 5.5 to about 7.5. The pH of the spheroidal particles is readily determined, for example, by immersing a sample thereof in deionized water and determining the resulting pH of the water.

It is a further preferred embodiment of this invention that subsequent to the oil age and prior to the aqueous ammoniacal age, the spheroidal particles are treated for a period of at least about 15 minutes in an ammonium salt-buffered aqueous ammoniacal solution containing from about 0.1 to about 0.5 wt.% ammonia and an ammonium salt concentration of from about 0.1 to about 10 wt.%. The ammonium salt is preferably ammonium chloride, although other ammonium salts such as ammonium nitrate, ammonium sulfate, ammonium acetate, and ammonium halides in general, are suitably employed.

In any case, the spheroidal particles are finally aged in an aqueous ammoniacal solution in accordance with the method of this invention. Thus, the spheroidal particles are aged for a period of from about 5 to about 25 hours at a temperature of from about 75° C. to about 105° C. in an aqueous ammoniacal solution containing from about 0.5 to about 3 wt.% ammonia and an ammonium salt concentration in the range of from about 4 to about 20 wt.%. The average bulk density of the spheroidal alumina product is adjusted in the range of from about 0.6 to about 0.8 grams per cubic centimeter by varying the ammonium salt concentration of said aqueous ammoniacal solution in the stated range, higher average bulk densities resulting from higher ammonium salt concentrations in the stated range. The spheroidal particles are preferably aged in said aqueous ammoniacal solution for a period of from about 10 to about 25 hours at a temperature of from about 90° C. to about 105° C.

After the aging treatment, the spheroidal particles are washed in any suitable manner. A particularly satisfactory method is to wash the particles by percolation, either with an upward or downward flow of water, and preferably with water containing a small amount of ammonium hydroxide and/or ammonium nitrate. After washing, the particles can be dried at a temperature of from about 95° C. to about 315° C. for 2 to 24 hours or more, or dried at this temperature and calcined at a temperature of from about 425° C. to about 750° C. for 2 to 12 hours or more, and utilized as such or composited with other catalytic components.

As heretofore mentioned, the oil-drop method includes a number of process variables affecting the physical characteristics of the spheroidal alumina product. Thus, the aluminum/acid anion ratio of the acidic alumina hydrosol will influence the average bulk density of the spheroidal alumina product, with lower ratios tending toward higher average bulk densities. The method of this invention affords a further increase in the average bulk density of the spheroidal alumina product, and said average bulk density is maximized utilizing an acidic alumina hydrosol having an aluminum/acid anion ratio of from about 0.9 to about 1.0.

The high surface area-high density spheroidal alumina particles prepared in accordance with the method of this invention are useful per se, or as a support or carrier material for other catalytic components including one or more metals of Groups V, VI-B and VIII, their oxides and their sulfides. In particular, the spheroidal alumina particles of this invention are useful as a support or carrier material for a platinum component, alone or in combination with a tin, germanium and/or rhenium component, to yield an improved reforming catalyst for the conversion of gasoline boiling range petroleum fractions. The reforming of gasoline feed stocks in contact with said reforming catalyst is suitably effected at a pressure of from about 50 to about 1000 psig. and at a temperature of from about 425° C. to about 595° C. Said catalyst permits a stable operation to be carried out in a preferred pressure range of from about 50 to about 500 psig. Similarly, the temperature required is generally lower than required for a similar reforming operation utilizing prior art reforming catalysts. Preferably, the temperature employed is in the range of from about 475° C. to about 575° C.

The following example is presented in illustration of the method of this invention and is not intended as an undue limitation on the generally broad scope of the invention as set out in the appended claims.

EXAMPLE I

An acidic alumina hydrosol was prepared by digesting aluminum pellets in dilute hydrochloric acid at about 102° C. to produce a hydrosol containing aluminum in about a 0.95:1 ratio with the chloride anion content thereof. The hydrosol was thereafter cooled to about 15° C. and admixed with a 28% aqueous hexamethylenetetramine solution to provide a hydrosol containing about 12 wt.% hexamethylenetetramine and about 8 wt.% aluminum. The hydrosol was formed into spheroidal hydrogel particles by dispersing the mixture as droplets in a gas oil suspending medium contained in a vertical column at about 95° C. The spheroidal particles were aged in the forming oil at a temperature of about 100° C., and attained a pH of 6.06 after 19 hours of aging. The oil-aged spheres were then separated and treated in an ammonium chloridebuffered aqueous ammoniacal solution for about 15 minutes at 95° C. The buffered solution contained 5 wt.% ammonium chloride and sufficient ammonium hydroxide to provide about 0.2 wt.% ammonia. The spheroidal particles were thereafter further aged for about 10 hours at 95° C. in an aqueous ammoniacal solution in accordance with prior art practice—the aqueous ammoniacal solution containing about 0.5 wt.% ammonia. In subsequent preparations, the last mentioned ammonia age was effected substantially as described except that the aqueous ammoniacal solution was prepared to contain 1, 4 and 8 wt.% concentrations of ammonium chloride. The influence of the ammonium chloride concentration on the average bulk density (ABD) of the spheroidal alumina product is evident with reference to the data set out in Table I below. In each case, the ammonia aged particles were water-washed, dried, and calcined in air for about 2 hours at 650° C. to yield a spheroidal alumina product of about 1/8" diameter.

TABLE I

| $NH_4Cl$, wt. % | 0 | 1 | 4 | 8 |
|---|---|---|---|---|
| ABD, gms/cc | 0.64 | 0.655 | 0.68 | 0.705 |
| Surface Area, $M^2/g$ | 206 | 190 | 175 | 179 |

I claim as my invention:

1. A method of preparing high density spheroidal alumina particles which comprises:
   (a) commingling an ammonia precursor and an acidic alumina hydrosol at below gelation temperature, said ammonia precursor being decomposable to ammonia with increasing temperature;
   (b) dispersing the mixture as droplets in a hot oil bath maintained at a temperature effecting decomposition of said ammonia precursor and the formation of spheroidal hydrogel particles therein;
   (c) separating and aging the spheroidal particles for a period of from about 5 to about 25 hours at a temperature of from about 75° C. to about 105° C. in an aqueous ammoniacal solution containing from about 0.5 to about 3 wt.% ammonia and an ammonium salt concentration in the range of from about 4 to about 20 wt.%, and adjusting the ABD of the spheroidal alumina product in the range of from about 0.6 to about 0.8 gms/cc by varying the ammonium salt concentration of said aqueous ammoniacal solution in the stated range; and,
   (d) water-washing, drying, and calcining the aged spheroidal alumina particles.

2. The method of claim 1 further characterized with respect to step (b) in that said spheroidal hydrogel particles are retained in said oil bath until said particles achieve a pH of from about 5.5 to about 7.5.

3. The method of claim 1 further characterized with respect to step (c) in that said spheroidal hydrogel particles are initially treated for a period of at least about 15 minutes in an ammonium salt-buffered aqueous ammoniacal solution containing from about 0.1 to about 0.5 wt.% ammonia and from about 0.5 to about 5 wt.% ammonium salt, said spheroidal hydrogel particles being thereafter aged in further accordance with step (c).

4. The method of claim 1 further characterized with respect to step (a) in that said acidic alumina hydrosol is an alumina hydroxyhalide hydrosol having an aluminum/halide anion ratio of from about 0.9 to about 1.5.

5. The method of claim 1 further characterized with respect to step (a) in that said alumina hydrosol is an alumina hydroxychloride hydrosol having an aluminum/chloride anion ratio of from about 0.9 to about 1.0.

6. The method of claim 1 further characterized with respect to step (a) in that said ammonia precursor is hexamethylenetetramine.

7. The method of claim 1 further characterized with respect to step (b) in that said oil bath is maintained at a temperature of from about 50° C. to about 105° C.

8. The method of claim 1 further characterized with respect to step (c) in that said ammonium salt is ammonium chloride.

9. The method of claim 1 further characterized with respect to step (c) in that said spheroidal particles are aged in said ammoniacal solution for a period of from about 10 to about 25 hours at a temperature of from about 90° C. to about 105° C.

10. The method of claim 1 further characterized with respect to step (d) in that said aged spheroidal particles are water-washed, dried, and calcined at a temperature of from about 425° C. to about 750° C.

* * * * *